US008136031B2

(12) United States Patent
Massand

(10) Patent No.: US 8,136,031 B2
(45) Date of Patent: Mar. 13, 2012

(54) COMPARING THE CONTENT OF TABLES CONTAINING MERGED OR SPLIT CELLS

(75) Inventor: Deepak Massand, McLeansville, NC (US)

(73) Assignee: Litera Technologies, LLC, McLeansville, NC (US)

( * ) Notice: Subject to any disclaimer, the term of this patent is extended or adjusted under 35 U.S.C. 154(b) by 316 days.

(21) Appl. No.: 12/406,093

(22) Filed: Mar. 17, 2009

(65) Prior Publication Data

US 2010/0241943 A1    Sep. 23, 2010

(51) Int. Cl.
 *G06F 17/00* (2006.01)
(52) U.S. Cl. .................... 715/229; 715/212; 715/227
(58) Field of Classification Search ............ 715/212
 See application file for complete search history.

(56) References Cited

U.S. PATENT DOCUMENTS

| | | | |
|---|---|---|---|
| 3,920,895 A | 11/1975 | Vieri et al. | |
| 3,920,896 A | 11/1975 | Bishop et al. | |
| 5,008,853 A | 4/1991 | Bly et al. | |
| 5,129,082 A | 7/1992 | Tirfing et al. | |
| 5,146,552 A | 9/1992 | Cassoria et al. | |
| 5,204,947 A | 4/1993 | Bernstein et al. | |
| 5,272,628 A * | 12/1993 | Koss ........................... 715/205 | |
| 5,321,505 A | 6/1994 | Leddy | |
| 5,341,469 A | 8/1994 | Rossberg et al. | |
| 5,515,491 A | 5/1996 | Bates et al. | |
| 5,539,871 A | 7/1996 | Gibson | |
| 5,596,700 A | 1/1997 | Darnell et al. | |
| 5,596,705 A | 1/1997 | Reimer et al. | |
| 5,606,609 A | 2/1997 | Houser et al. | |
| 5,659,676 A | 8/1997 | Redpath | |
| 5,664,208 A | 9/1997 | Pavely et al. | |
| 5,669,005 A | 9/1997 | Curbow et al. | |
| 5,671,428 A | 9/1997 | Muranaga et al. | |
| 5,694,544 A | 12/1997 | Tanigawa et al. | |
| 5,706,452 A | 1/1998 | Ivanov | |
| 5,706,502 A | 1/1998 | Foley et al. | |
| 5,708,826 A | 1/1998 | Ikeda et al. | |
| 5,708,845 A | 1/1998 | Wistendahi et al. | |
| 5,740,444 A | 4/1998 | Frid-Nielsen | |
| 5,752,055 A | 5/1998 | Redpath et al. | |
| 5,758,313 A | 5/1998 | Shah et al. | |
| 5,761,419 A | 6/1998 | Schwartz et al. | |
| 5,761,499 A | 6/1998 | Sonderegger | |
| 5,781,732 A | 7/1998 | Adams | |
| 5,781,901 A | 7/1998 | Kuzma | |
| 5,787,175 A | 7/1998 | Carter | |

(Continued)

OTHER PUBLICATIONS

Valade, Janet; PHP & MySQL: Your visual blueprint for creating dynamic, database-driven Web sites; 2006; Wiley; p. 63.*

(Continued)

*Primary Examiner* — Stephen Hong
*Assistant Examiner* — Asher Kells
(74) *Attorney, Agent, or Firm* — Finnegan, Henderson, Farabow, Garrett & Dunner, LLP

(57) ABSTRACT

A system, method and computer program product for comparison of content within tables, separate from the form and structure of those tables; including identifying tables in a first and second document, creating respective text arrays of content of the tables from the first and second documents, comparing the content of the respective text arrays to determine differences between the content of the tables, and displaying the determined differences between the content of the tables, regardless of form or structure of the tables.

24 Claims, 5 Drawing Sheets

U.S. PATENT DOCUMENTS

| | | | |
|---|---|---|---|
| 5,799,191 | A | 8/1998 | Moriyasu et al. |
| 5,801,702 | A | 9/1998 | Dolan et al. |
| 5,809,512 | A | 9/1998 | Kato |
| 5,860,073 | A | 1/1999 | Ferrel et al. |
| 5,864,870 | A | 1/1999 | Guck |
| 5,870,754 | A | 2/1999 | Dimitrova et al. |
| 5,878,421 | A | 3/1999 | Ferrel et al. |
| 5,890,177 | A | 3/1999 | Moody et al. |
| 5,893,126 | A | 4/1999 | Drews et al. |
| 5,911,776 | A | 6/1999 | Guck |
| 5,931,906 | A | 8/1999 | Fidelibus, Jr. et al. |
| 5,937,066 | A | 8/1999 | Gennaro et al. |
| 5,938,724 | A | 8/1999 | Pommier et al. |
| 5,941,944 | A | 8/1999 | Messerly |
| 5,944,785 | A | 8/1999 | Pommier et al. |
| 5,949,413 | A | 9/1999 | Lerissa et al. |
| 5,950,214 | A | 9/1999 | Rivette et al. |
| 5,956,736 | A | 9/1999 | Hanson et al. |
| 5,958,006 | A | 9/1999 | Eggleston et al. |
| 5,978,836 | A | 11/1999 | Ouchi |
| 5,987,469 | A | 11/1999 | Lewis et al. |
| 6,009,462 | A | 12/1999 | Birrell et al. |
| 6,014,135 | A | 1/2000 | Fernandes |
| 6,029,171 | A | 2/2000 | Smiga et al. |
| 6,064,751 | A | 5/2000 | Smithies et al. |
| 6,067,551 | A | 5/2000 | Brown et al. |
| 6,088,709 | A | 7/2000 | Watanabe |
| 6,119,147 | A | 9/2000 | Tommey et al. |
| 6,158,903 | A | 12/2000 | Schaeffer et al. |
| 6,178,431 | B1 | 1/2001 | Douglas |
| 6,182,080 | B1 | 1/2001 | Clements |
| 6,212,534 | B1 | 4/2001 | Lo et al. |
| 6,243,722 | B1 | 6/2001 | Day et al. |
| 6,289,460 | B1 | 9/2001 | Hajmiragha |
| 6,317,777 | B1 | 11/2001 | Skarbo et al. |
| 6,324,555 | B1 | 11/2001 | Sites |
| 6,334,141 | B1 | 12/2001 | Varma et al. |
| 6,336,134 | B1 | 1/2002 | Varma |
| 6,343,313 | B1 | 1/2002 | Salesky et al. |
| 6,360,236 | B1 | 3/2002 | Khan et al. |
| 6,363,352 | B1 | 3/2002 | Dailey et al. |
| 6,411,989 | B1 | 6/2002 | Anupam et al. |
| 6,560,637 | B1 | 5/2003 | Dunlap et al. |
| 6,590,584 | B1 | 7/2003 | Yamaura et al. |
| 6,643,663 | B1 | 11/2003 | Dabney et al. |
| 6,681,371 | B1 | 1/2004 | Devanbu |
| 6,687,878 | B1 | 2/2004 | Eintracht et al. |
| 6,708,172 | B1 | 3/2004 | Wong et al. |
| 7,146,561 | B2 * | 12/2006 | Bauchot et al. ................ 715/212 |
| 7,251,680 | B2 | 7/2007 | DeVos |
| 7,260,773 | B2 * | 8/2007 | Zernik ........................ 715/229 |
| 7,266,554 | B2 * | 9/2007 | Kayahara et al. ..................... 1/1 |
| 7,650,355 | B1 | 1/2010 | Davis |
| 7,987,444 | B2 | 7/2011 | Fuller et al. |
| 2001/0037367 | A1 | 11/2001 | Iyer |
| 2002/0023106 | A1 * | 2/2002 | Bauchot et al. ................ 707/503 |
| 2002/0049786 | A1 | 4/2002 | Bibliowicz et al. |
| 2002/0059342 | A1 | 5/2002 | Gupta et al. |
| 2002/0059343 | A1 | 5/2002 | Kurishima et al. |
| 2002/0065848 | A1 | 5/2002 | Walker et al. |
| 2002/0078088 | A1 | 6/2002 | Kuruoglu et al. |
| 2002/0085030 | A1 | 7/2002 | Ghani |
| 2002/0107886 | A1 | 8/2002 | Gentner et al. |
| 2002/0143691 | A1 | 10/2002 | Ramaley et al. |
| 2003/0023961 | A1 | 1/2003 | Barsness et al. |
| 2003/0112273 | A1 | 6/2003 | Hadfield et al. |
| 2003/0158855 | A1 | 8/2003 | Farnham et al. |
| 2003/0197730 | A1 | 10/2003 | Kakuta et al. |
| 2003/0217336 | A1 | 11/2003 | Gounares et al. |
| 2004/0085354 | A1 | 5/2004 | Massand |
| 2004/0205653 | A1 | 10/2004 | Hadfield et al. |
| 2004/0230616 | A1 | 11/2004 | Kruy et al. |
| 2005/0108280 | A1 | 5/2005 | Kagle et al. |
| 2006/0167879 | A1 | 7/2006 | Umeki et al. |
| 2006/0253482 | A1 | 11/2006 | Zellweger et al. |
| 2006/0262339 | A1 | 11/2006 | Jacobs et al. |
| 2007/0011183 | A1 * | 1/2007 | Langseth et al. ............... 707/101 |
| 2007/0186157 | A1 | 8/2007 | Walker et al. |
| 2008/0222508 | A1 * | 9/2008 | Nguyen et al. ................. 715/212 |
| 2008/0256188 | A1 | 10/2008 | Massand |
| 2008/0275870 | A1 * | 11/2008 | Shanahan et al. .................. 707/5 |
| 2008/0301193 | A1 | 12/2008 | Massand |
| 2009/0119578 | A1 | 5/2009 | Relyea et al. |
| 2009/0276692 | A1 * | 11/2009 | Rosner .......................... 715/227 |
| 2010/0049745 | A1 | 2/2010 | Aebig et al. |

OTHER PUBLICATIONS

Hey, Scripting Guy! Blog: How Can I Build an Array from a Column of Data in Excel?; Oct. 12, 2005; pp. 1-2.*
U.S. Appl. No. 12/350,144, filed Jan. 7, 2009.
Office Action, dated Mar. 23, 2011, U.S. Appl. No. 12/350,144 (14 pages).
Office Action, dated Aug. 11, 2011, U.S. Appl. No. 12/350,144 (19 pages).
Formula Software, Excel Compare, Oct. 3, 2008, pp. 1-2 (2 pages).

* cited by examiner

ORIGINAL DOCUMENT
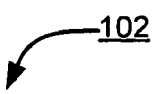
MODIFIED DOCUMENT
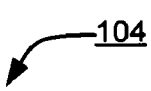
REDLINE DOCUMENT
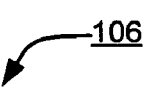
FIG. 1

ORIGINAL DOCUMENT — 202

| Facilities:<br>Amount:<br>Currency: | Term loan facilities.<br>Facility A: [*Insert currency and amount of term facility*]<br>Facility B: [¹*Insert currency and amount of term facility*]<br>Facility C: [*Insert currency and amount of term facility*] |
|---|---|

MODIFIED DOCUMENT — 204

| Facilities: | Term loan facilities. |
|---|---|
| Amount: | Facility A: [*Insert currency and amount of term facility*] |
| Currency: | Facility B: [¹*Insert currency and amount of term facility*]. New currency. |
|  | The Facility C: [*Insert currency and amount of term facility*] |

REDLINE DOCUMENT — 206

| Facilities: | Term loan facilities. |
|---|---|
| Amount: | Facility A: [*Insert currency and amount of term facility*] |
| Currency: | Facility B: [¹*Insert currency and amount of term facility*]. New currency. |
|  | The Facility C: [*Insert currency and amount of term facility*] |

| Original Column/ Modified Column | 1,1 | 1,2 | 2,1 | 2,2 | 2,3 |
|---|---|---|---|---|---|
| 1 | 1 |  | 1 |  |  |
| 2 |  | 2+1 |  | 1+1 | 1+3 |

COMPARING THE CONTENT OF TABLES CONTAINING MERGED OR SPLIT CELLS

FIELD OF THE INVENTION

The present invention generally relates to the comparison of tables within multiple documents, and more particularly, to a system and method for the comparison of content within tables separate from the form and structure of those tables.

BACKGROUND

The need to manage and mitigate risks in documents, including changes made to document versions by internal and external sources, has become an essential component of a number of business specialties involved in documents that may be sensitive in nature, such as those found in the legal, financial, government and accounting business sectors. Professionals in industries that consistently engage in document sharing and collaboration within and outside of their organizations find document comparison programs to be essential in ensuring these professionals identify and address all changes made throughout a document's lifecycle and all sensitive metadata held within their documents.

Documents can be edited in a number of programs by multiple users. Changes can be made to text, tables, images, and other embedded objects, values and formulas, header and footer content, comments, and many other document aspects. Even documents that appear to be protected from change, such as PDF documents, are not secure from the possibility of being the recipients of changes or modifications. Users can edit those PDF documents in their native format or convert to a separate file type, edit the document, and then recreate a PDF of that document. A review of a document after it has been shared with an external source, either by humans or by computer programs, is thus necessitated to ensure any changes are accurately identified in the document content.

Document comparison programs, such as Litera ChangePro, Workshare Professional or Deltaview, Soft Interface DiffDocs, DocsCorp Comparedocs and Esquire Innovations iRedline are computer applications that compare differences between two documents (e.g., Microsoft Word, Excel and PowerPoint Documents, PDF documents, HTML documents, database tables, etc.), a task formerly reserved solely for humans. These programs identify and ascertain differences in an original (first) and modified (second) document and display those differences in a third document, commonly referred to as a 'redline' document.

The use of conventional document comparison programs that produce 'redline' documents has, to date, been limited in its capacity to incorporate context in review of changes made between original and modified documents in relation to information displayed within tables in Microsoft® Word, Word_Perfect®, HTML, PDF and other document formats. Conventional methods and systems are limited in their ability to comprehend context within table layouts. They are only capable of comparing information presented within tables by comparing information stored at a cellular level. If a change is made to content within a cell, such as merging or splitting cells (both standard table layout processes), that change will be listed as a deletion or addition by the conventional methods and systems. The entire cell (including all content therein) will be displayed by the conventional methods and systems as having been changed. If multiple lines of text exist in the original document in a single cell and this text is moved into multiple cells, the conventional methods and systems would show all the text in the original cell as deleted and all the text in the new cells as an addition.

This presentation of a change to the table cell, even in a scenario where the context of such a change does not affect the user's comprehension of that information, belies the way that users experience and engage with content within tables. The merging of two cells, both containing content, does not change the context of the content originally held within those two, separate cells. Conventional methods and systems, however, consider such a change to a table layout a change to the content itself and mark that content as changed (as a deletion and addition). This limits the user's ability to view a document and decipher which changes made to that document are contextually relevant.

SUMMARY

Embodiments of the invention provide an improved method and system, including a novel algorithm, herein termed the Intelligent Algorithm, that recognizes the merging and splitting of table cells and compares content in tables in a first document and a second document across and within those merged and split table cells. In an exemplary embodiment, the system and method, advantageously, provides the ability to compare content within tables in context of the additions and deletions of cells in tables caused by the merging and splitting of cells in tables by disregarding table structure, with the exception of scenarios in which additional content and cells in combination have been added or existing content and cells in combination have been deleted. The merging or splitting of cells, the rearrangement of content into parallel cells and other similar amendments to layout, when not representative of contextual change, are not recorded or listed as changes to documents by the exemplary embodiment. The Intelligent Algorithm is able to contextualize changes made within tables by creating an array of text found within a table in both an original (first) and a modified (second) document, then comparing the text array in the original document to the text array in the modified document, and, finally, displaying the text back to a user. Only words that have been modified (added or deleted) will be displayed by the Intelligent Algorithm as changes to the user (and not the entire cell content, as is conducted by prior art).

Accordingly, an exemplary system, method and computer program product for comparison of content within tables, separate from the form and structure of those tables; identifying tables in a first and second document, creating respective text arrays of content of the tables from the first and second documents, comparing the content of the respective text arrays to determine differences between the content of the tables, and displaying the determined differences between the content of the tables, regardless of form or structure of the tables, is presented.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, which are included to provide a further understanding of the invention and are incorporated in and constitute a part of this specification. In the drawings:

FIG. 1 provides examples of modifications of a table structure in an original and modified document and the presentation of those modifications in a redline document created by conventional systems and methods;

FIG. 2 provides examples of modifications of a table structure in an original and modified document and the presentation of those modifications in a redline document created by the exemplary system and method;

FIG. 5 illustrates a diagram of the mechanism by which the Intelligent Algorithm restructures table content into a dynamic programming matrix to identify and discern content changes separate from form and structure.

DETAILED DESCRIPTION

Figure 3:
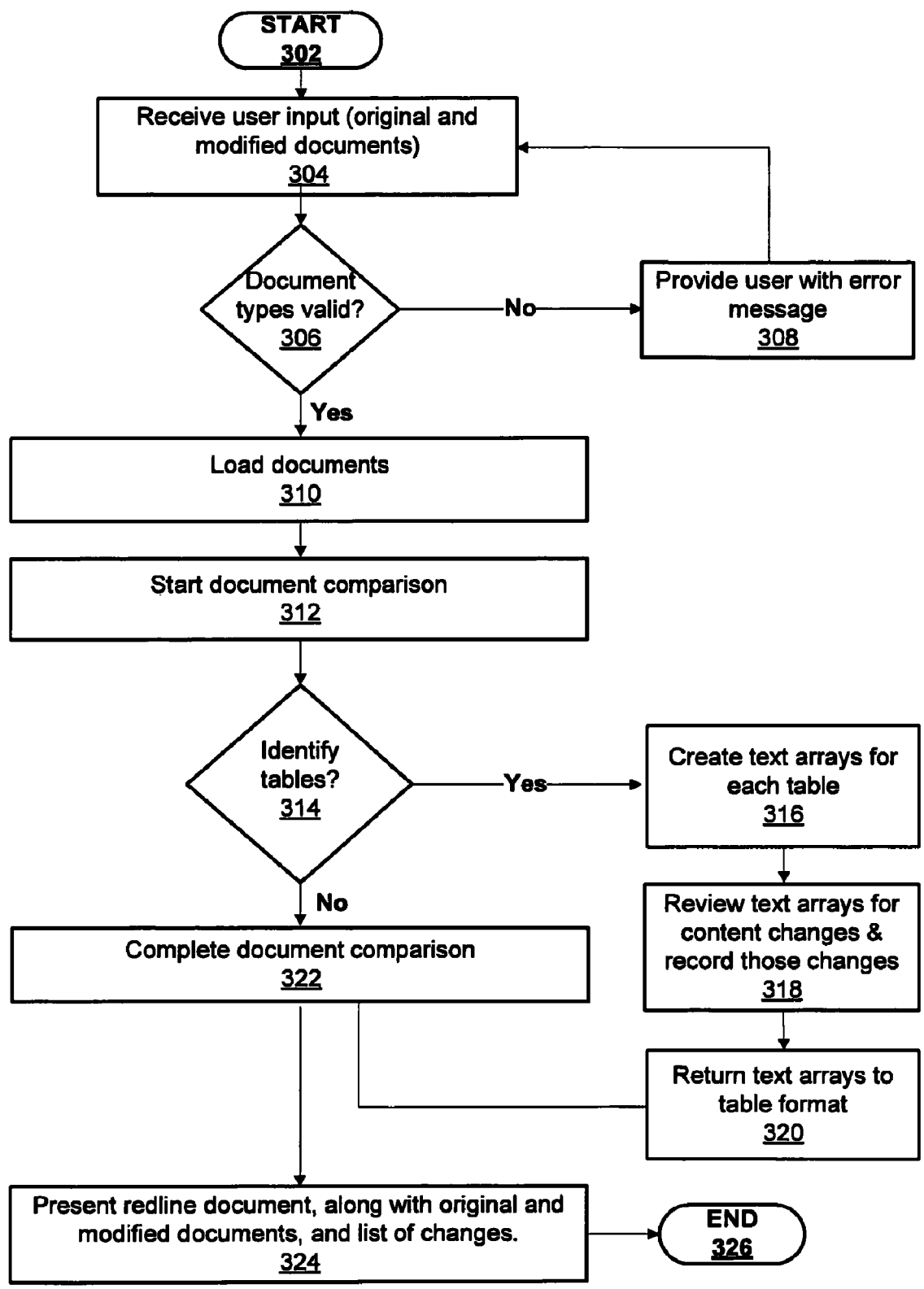
FIG. 3 is a process flowchart of the exemplary process for the comparison of data within tables that recognizes and respects that changes made by the addition or deletion of cells in tables may not change the context of content.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

The invention includes recognition that conventional systems detect changes made within tables (including changes to text and the addition and deletion of cells in tables) in a first document and a second document and provide for the ability for users to view those changes in a third, 'redline' document. However, these systems fail to provide for a way to disregard changes made to form and structure of tables when those changes do not affect the presentation of content within those tables.

Generally, the exemplary embodiments include the capacity to compare content within tables in two documents separate from the form and structure of those documents. In the Intelligent Algorithm, the following steps are taken to provide this capacity: (1) the system and method first compares tables in documents using the traditional methods used by prior art; (2) when an added or deleted cell in a table is detected before or after an existing cell in a table, those cells are merged with the existing cell; (3) these merged and split cells in one document are connected to a corresponding cell in the other document by applying a dynamic programming matrix to the tables in the two documents. These merged cells are compared with the single comparable cell from the other document. Where there is discovered similarity (or where there is discovered the longest common subsequence between cell text strings), the system and method considers those cells merged or split. For each merged or split cell, the cell merging/splitting algorithm is applied. The dynamic programming matrix is constructed. Matrix cells are filled with numbers delineating the amount of similar words in one cell in a table from one document to the other and columns of the matrix are filled with merged/split cells. The matrix uses the following code to fill each cell in that table:

```
dist = LCS(orgCell[i], modCell[j]);
    left = dp_matrix[i, j – 1];
    top = dp_matrix [i – 1, j];
    center = dp_matrix[i – 1, j – 1] + dist;
    merge = LCS (orgCell[i – 1] + orgCell[i], modCell[j]);
    dp_matrix[i, j] = max(max(center, merge), max(left,top));
```

Where I, J are the linear indexes of table cells, orgCell and modCell are two arrays that hold the table cells' strings, and dp-matrix is a dynamic programming matrix. LCS is the function that returns Longest common sequence of two cell strings.

Referring now to the drawings, wherein like reference numerals designate identical or corresponding parts throughout the several views, and more particularly to FIG. 1 thereof, which illustrates, through example, the means by which prior art displays modifications of table structure between an original and modified document in a third, redline document 100.

In FIG. 1, a table from an original (first) document is displayed in 102 in which all information is presented in a single-row, two-column table, with strings of text separated by a paragraph mark. In 104, a table from a modified (second) document is displayed, in which the table has been modified. In this modified table, text strings, formerly separated by paragraph marks, are now separated into individual table cells. What was in the original document a single-row, two-column table is now a four-row, two-column table. While the context of the content has not changed, the presentation of that content in relation to table structure has been modified. In 106, one can see the presentation of these changes, as defined by conventional systems and methods, in a redline display of that modified table. Conventional systems and methods are able to only recognize that the table structure has changed, but not that the context in which data are presented within that table is unchanged. Conventional systems and methods display in its redline document the change in table structure as a series of deletions and additions of content. One can see that the entirety of content, with the exception of the first text string in each column, displayed, first as a deletion 108 and, second, as an addition 110. Thus, conventional systems and methods, as shown in 100, are unable to contextualize that the table structure has been modified, but that the context in which that content is understood has not been changed. Viewers of the redline document must, then, review the entirety of the supposed changes to ensure that no individual portion of text has been changed, defeating the purpose of the redline document, to remove that requirement from the viewer and automate the process of document change management.

FIG. 2 illustrates through example the means by which the exemplary system and method displays modifications of table structure in an original and modified document in a third, redline document 200. In FIG. 2, a table from the original (first) document is displayed in 202, as was the case in FIG. 1 at 102, in which all information is presented in a single-row, two-column table, with strings of text separated by a paragraph mark. In 204, a table from a modified (second) document is displayed, in which, as was the case in FIG. 1 at 104, the table has been modified. In this modified table, text strings, formerly separated by paragraph marks, are now separated in individual table cells. What was, in the original document, a single-row, two-column table is now a four-row, two-column table. While the context of the content has not changed, the presentation of that content in relation to table structure has been modified. In 206, one can see the exemplary presentation of a third, redline display of that table. As is presented here, no text is marked as having been changed (deleted or added). Because the content has not been modified, and the meaning of the change is simply that of an underlying table structure change, the exemplary system and method does not display such a change in its redline document.

FIG. 3 illustrates a detailed exemplary process 300 for the intelligent comparison of table modifications, wherein the process at step 302 is started. The exemplary system and method receives user input (the original, or first, document and the modified, or second, document) at step 304. The exemplary system and method then verifies the validity of the document types at step 306. If the document types are not valid, the user is warned via an error message at step 308 and provided with the option of re-uploading two valid documents at step 304. Once the two documents have been verified as valid, the exemplary system and method loads the documents, at step 310, and begins the document comparison process at step 312. During the document comparison process, the exemplary system and method scans the document and searches for the existence of tables. If tables are identified at step 314, text and layout within the tables in the original document and the modified document are converted to text arrays at step 316, and then reviewed for changes at step 318. After the text arrays have been reviewed and all changes, if any, have been documented at step 318, the text arrays are returned to table format at step 320 and control is sent to step 322 to complete the document comparison. Any changes discovered in the text arrays are displayed in the redline document at step 324, along with other changes to the document stored in regions outside of the above-described tables, and completing the process at step 326.

Figure 4:
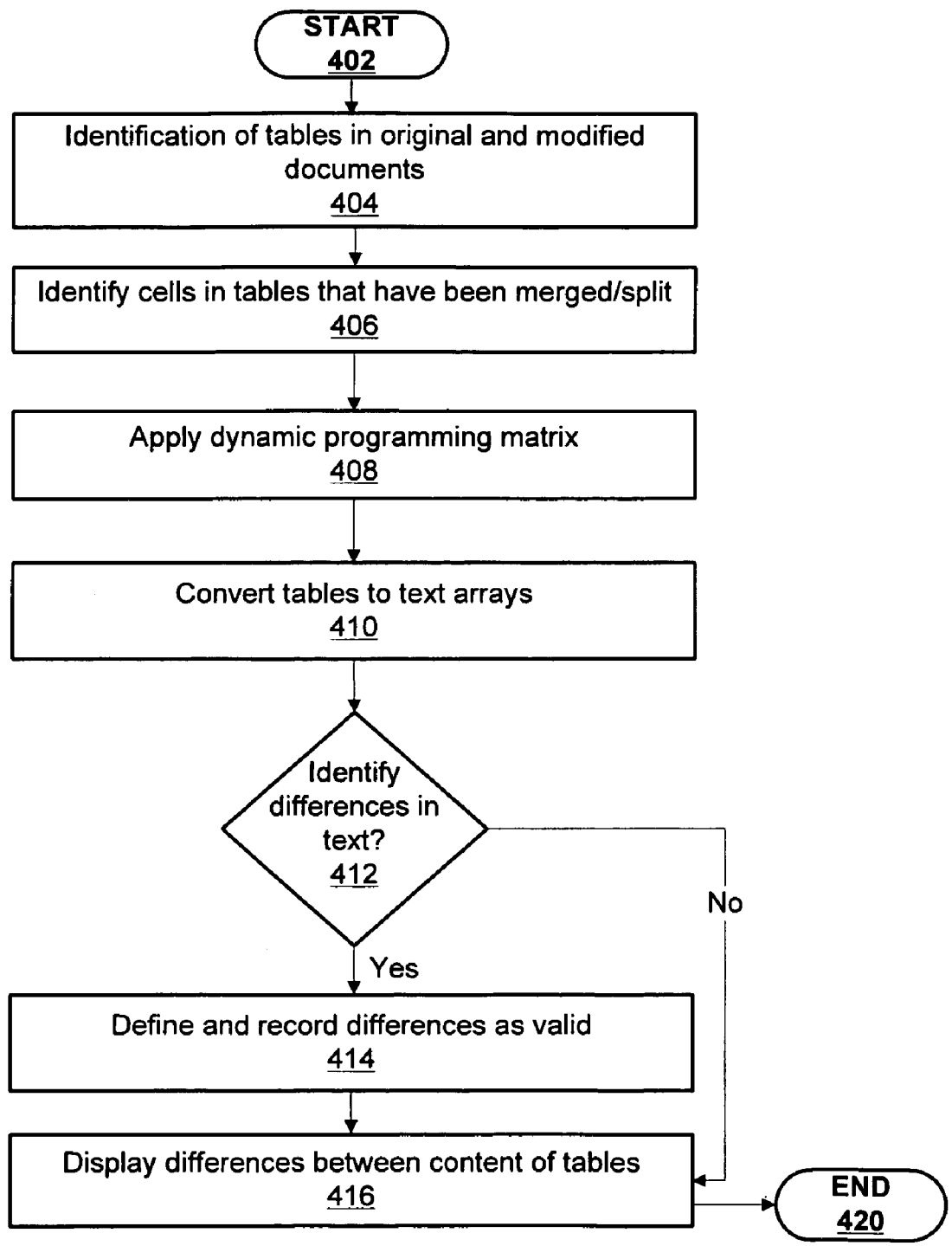
FIG. 4 is a process flowchart of the exemplary process by which the Intelligent Algorithm restructures table content into a dynamic programming matrix to identify and discern content changes separate from form and structure.

FIG. 4 is a process flowchart of the exemplary process by which the Intelligent Algorithm restructures table content into a dynamic programming matrix to identify and discern content changes separate from form and structure. In FIG. 4, at step 402, the process begins, and identification of tables in original and modified documents is performed at step 404. At step 406, cells in tables that have been merged or split are identified by looking for additions or deletions of cells adjacent to existing cells. In step 408, a dynamic programming matrix is applied to the cells in the tables, which enables a cell or a series of merged or split cells in one table in a document to be considered comparable to a cell or a series of merged or split cells in one table in the other document. At step 410, creation of text arrays for each table is performed. Step 412 identifies differences in the text and if changes are detected step 414 defines and records changes as valid and transfers control to step 416. Otherwise, if step 412 does not identify changes in the text, control also is transferred to step 416. Step 416 displays the differences between the content of the tables, and the process completes at step 418.

FIG. 5 illustrates the mechanism by which the Intelligent Algorithm restructures table content into a dynamic programming matrix to identify and discern content changes separate from form and structure. In FIG. 5, one can see in 502 the presentation of a table in its original form. In 504, one can see a modification of that table, in which the right column has been split into three separate cells, containing particular data from the single cell in the original table. In 506, one can see the dynamic programming matrix portion of the intelligent algorithm, in which the similarities in content in each row and column (in the original and the modified documents) are identified and quantified. In cases where the amounts of similarities are greater than the differences (e.g., the last cell in the bottom row of 506 of the matrix), the system and method considers those cells to have been merged or split (in this case, split) and compares data within them with this consideration in place.

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of the appended claims.

What is claimed is:

1. A computer-implemented method for comparing content comprising:
   identifying a first table in a first document and a second table in a second document;
   determining, by a processor, that a first cell from the first table is a merger of a plurality of cells from the second table;
   creating a first text array of content of the first table and a second text array of content of the second table, based on the determining; and
   comparing, by the processor, the first text array with the second text array to determine differences between content of the first cell from the first table and all of the content of the plurality of cells from the second table.

2. The method of claim 1, wherein the step of determining that the first cell is a merger of the plurality of cells comprises:
   determining that at least some of the plurality of cells of the second table have been added adjacent to an existing cell of the plurality of cells of the second table;
   creating a dynamic programming matrix, each matrix cell reflecting an amount of similar words in a set of cells from the first table and a set of cells from the second table; and
   applying the dynamic programming matrix to determine that the first cell is a merger of the plurality of cells.

3. The method of claim 1, further comprising:
   generating data used to display the determined differences between the content of the first cell of the first table and the content of the plurality of cells of the second table.

4. The method of claim 1, further comprising:
   when no determined differences are found between the content of the first cell of the first table and the content of the plurality of cells of the second table, generating data used to indicate the content of the plurality of cells of the second table is unchanged.

5. A computer program product for comparing content including one or more computer-readable instructions embedded on a non-transitory computer-readable medium that causes one or more computer processors to perform the steps of:
   identifying a first table in a first document and a second table in a second document;
   determining that a first cell from the first table is a merger of a plurality of cells from the second table;
   creating a first text array of content of the first table and a second text array of content of the second table, based on the determining; and
   comparing the first text array with the second text array to determine differences between content of the first cell from the first table and all of the content of the plurality of cells from the second table.

6. The computer program product of claim 5, wherein the step of determining that the first cell is a merger of the plurality of cells comprises:
   determining that at least some of the plurality of cells of the second table have been added adjacent to an existing cell of the plurality of cells of the second table;
   creating a dynamic programming matrix, each matrix cell reflecting an amount of similar words in a set of cells from the first table and a set of cells from the second table; and
   applying the dynamic programming matrix to determine that the first cell is a merger of the plurality of cells.

7. The computer program product of claim 5, wherein the instructions further cause the one or more computer processors to perform the step of:

generating data used to display the determined differences between the content of the first cell of the first table and the content of the plurality of cells of the second table.

8. The computer program product of claim 5, wherein the instructions further cause the one or more computer processors to perform the step of:
when no determined differences are found between the content of the first cell of the first table and the content of the plurality of cells of the second table, generating data used to indicate the content of the plurality of cells of the second table is unchanged.

9. A system for comparing content, the system comprising:
a memory having instructions; and
a processor configured to:
execute the instructions to identify a first table in a first document and a second table in a second document;
execute the instructions to determine that a first cell from the first table is a merger of a plurality of cells from the second table;
execute the instructions to create a first text array of content of the first table and a second text array of content of the second table, based on the determining; and
execute the instructions to compare the first text array with the second text array to determine differences between content of the first cell from the first table and all of the content of the plurality of cells from the second table.

10. The system of claim 9, wherein the processor is further configured to, when executing the instructions to determine that the first cell is a merger of the plurality of cells:
execute the instructions to determine that at least some of the plurality of cells of the second table have been added adjacent to an existing cell of the plurality of cells of the second table;
execute the instructions to create a dynamic programming matrix, each matrix cell reflecting an amount of similar words in a set of cells from the first table and a set of cells from the second table; and
execute the instructions to apply the dynamic programming matrix to determine that the first cell is a merger of the plurality of cells.

11. The system of claim 9, wherein the processor is further configured to:
execute the instructions to generate data used to display the determined differences between the content of the first cell of the first table and the content of the plurality of cells of the second table.

12. The system of claim 9, wherein when no determined differences are found between the content of the first cell of the first table and the content of the plurality of cells of the second table the processor is further configured to:
execute the instructions to generate data used to indicate the content of the plurality of cells of the second table is unchanged.

13. A computer-implemented method for comparing content comprising:
identifying a first table in a first document and a second table in a second document;
determining, by a processor, that a plurality of cells from the second table are a split of a first cell from the first table;
creating a first text array of content of the first table and a second text array of content of the second table, based on the determining; and
comparing, by the processor, the first text array with the second text array to determine differences between content of the first cell from the first table and all of the content of the plurality of cells from the second table.

14. The method of claim 13, wherein the step of determining that the plurality of cells is a split of the first cell comprises:
determining that at least some of the plurality of cells of the second table have been added adjacent to an existing cell of the plurality of cells of the second table;
creating a dynamic programming matrix, each matrix cell reflecting an amount of similar words in a set of cells from the first table and a set of cells from the second table; and
applying the dynamic programming matrix to determine that the plurality of cells are a split of the first cell.

15. The method of claim 13, further comprising:
generating data used to display the determined differences between the content of the first cell of the first table and the content of the plurality of cells of the second table.

16. The method of claim 13, further comprising:
when no determined differences are found between the content of the first cell of the first table and the content of the plurality of cells of the second table, generating data used to indicate the content of the plurality of cells of the second table is unchanged.

17. A computer program product for comparing content including one or more computer-readable instructions embedded on a non-transitory computer-readable medium that causes one or more computer processors to perform the steps of:
identifying a first table in a first document and a second table in a second document;
determining that a plurality of cells from the second table are a split of a first cell from the first table;
creating a first text array of content of the first table and a second text array of content of the second table, based on the determining; and
comparing the first text array with the second text array to determine differences between content of the first cell from the first table and all of the content of the plurality of cells from the second table.

18. The computer program product of claim 17, wherein the step of determining that the plurality of cells is a split of the first cell comprises:
determining that at least some of the plurality of cells of the second table have been added adjacent to an existing cell of the plurality of cells of the second table;
creating a dynamic programming matrix, each matrix cell reflecting an amount of similar words in a set of cells from the first table and a set of cells from the second table; and
applying the dynamic programming matrix to determine that the plurality of cells are a split of the first cell.

19. The computer program product of claim 17, wherein the instructions further cause the one or more computer processors to perform the step of:
generating data used to display the determined differences between the content of the first cell of the first table and the content of the plurality of cells of the second table.

20. The computer program product of claim 17, wherein the instructions further cause the one or more computer processors to perform the step of:
when no determined differences are found between the content of the first cell of the first table and the content of the plurality of cells of the second table, generating data used to indicate the content of the plurality of cells of the second table is unchanged.

21. A system for comparing content, the system comprising:
- a memory having instructions; and
- a processor configured to:
  - execute the instructions to identify a first table in a first document and a second table in a second document;
  - execute the instructions to determine that a plurality of cells from the second table are a split of a first cell from the first table;
  - execute the instructions to create a first text array of content of the first table and a second text array of content of the second table, based on the determining; and
  - execute the instructions to compare the first text array with the second text array to determine differences between content of the first cell from the first table and all of the content of the plurality of cells from the second table.

22. The system of claim 21, wherein the processor is further configured to, when executing the instructions to determine that the plurality of cells is a split of the first cell:
- execute the instructions to determine that at least some of the plurality of cells of the second table have been added adjacent to an existing cell of the plurality of cells of the second table;
- execute the instructions to create a dynamic programming matrix, each matrix cell reflecting an amount of similar words in a set of cells from the first table and a set of cells from the second table; and
- execute the instructions to apply the dynamic programming matrix to determine that the plurality of cells are a split of the first cell.

23. The system of claim 21, wherein the processor is further configured to:
- execute the instructions to generate data used to display the determined differences between the content of the first cell of the first table and the content of the plurality of cells of the second table.

24. The system of claim 21, wherein when no determined differences are found between the content of the first cell of the first table and the content of the plurality of cells of the second table the processor is further configured to:
- execute the instructions to generate data used to indicate the content of the plurality of cells of the second table is unchanged.

* * * * *